United States Patent [19]

Ives

[11] Patent Number: 4,602,722
[45] Date of Patent: Jul. 29, 1986

[54] LEAK-RESISTANT FIBERGLASS TANK AND METHOD OF MAKING THE SAME

[76] Inventor: Frank E. Ives, 26601 Dover Ct., Kent, Wash. 98031

[21] Appl. No.: 715,953

[22] Filed: Mar. 25, 1985

[51] Int. Cl.$^4$ ............................................. B65H 81/00
[52] U.S. Cl. ........................................ 220/414; 220/3; 138/144
[58] Field of Search .................. 220/414, 1 B, 3, 450, 220/453, 455; 138/141, 144, 145, DIG. 2, DIG. 10; 156/195

[56] References Cited

U.S. PATENT DOCUMENTS

| | | | |
|---|---|---|---|
| 2,614,058 | 10/1952 | Francis | 220/3 X |
| 2,723,705 | 11/1955 | Collins | 220/3 X |
| 2,798,510 | 7/1957 | Martin et al. | 138/144 |
| 2,877,150 | 3/1959 | Wilson | 138/141 X |
| 3,247,869 | 4/1966 | Boegershausen et al. | 138/144 |
| 3,372,075 | 3/1968 | Holt et al. | 220/414 X |
| 3,545,495 | 12/1970 | Falcomato et al. | 138/144 |
| 4,081,302 | 3/1978 | Drostholm et al. | 138/144 X |

Primary Examiner—Steven M. Pollard
Attorney, Agent, or Firm—Christensen, O'Connor, Johnson & Kindness

[57] ABSTRACT

A tank for use in storing volatile liquids and, in particular, petroleum distillates, includes a fiberglass outer wall lined with a metal foil liner that substantially covers the entire interior surface of the fiberglass tank. In a preferred method of constructing a tank, a lay-up mandrel has a foil end cap placed over a first end thereof and pressed to fit closely the exterior surface topography of the mandrel. A strip of metal foil is laid down on the mandrel overlying at least a portion of the metal foil end cap and the metal strip is wound in a helical fashion such that the adjacent coils of the helix overlap one another until the mandrel is essentially completely covered by the metal foil. Fiberglass resin and glass fibers are then laid down over the metal foil and cured in place. The mandrel is then removed, leaving a foil-lined fiberglass tank.

6 Claims, 5 Drawing Figures

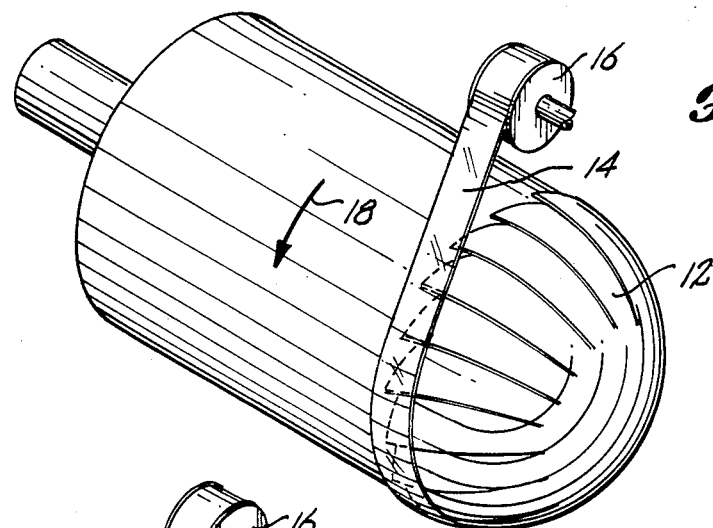
Fig.3.
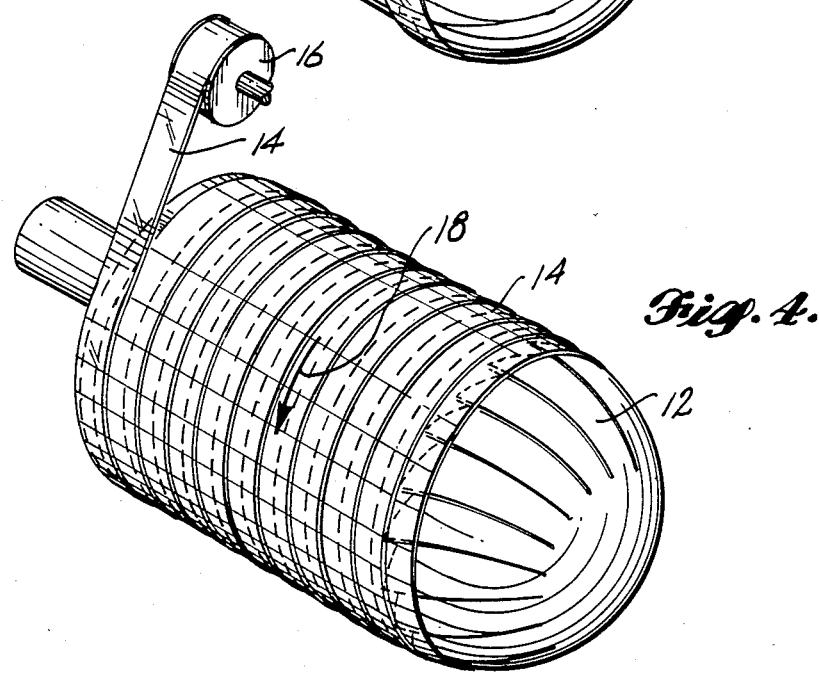
Fig.4.
Fig.5.
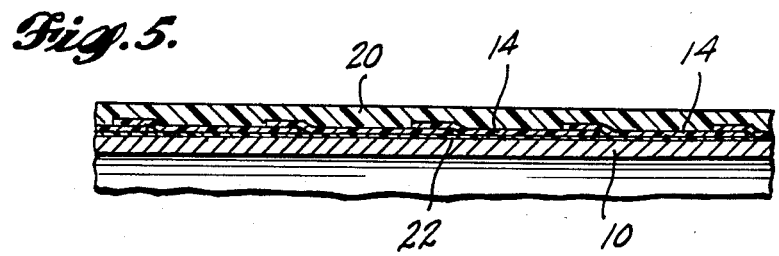

LEAK-RESISTANT FIBERGLASS TANK AND METHOD OF MAKING THE SAME

BACKGROUND OF THE INVENTION

This invention relates to fiberglass tanks and, in particular, fiberglass tanks for use in underground applications for holding gasoline and other volatile substances.

In recent years, the trend has been to manufacture underground tanks used to store gasoline and other fuels at service stations in underground tanks made of fiberglass. Also, many of the metal tanks that have been installed in past years have now begun to leak due to corrosion and are being replaced with fiberglass tanks because of the inherent resistance of the fiberglass to moisture-caused corrosion in underground applications. Recently the Environmental Protection Agency has proposed the elimination of lead as an octane-boosting additive in gasoline. In order to maintain high-octane ratings of gasolines, it will be necessary for the industry to mix some other additive with the gasoline. The most likely candidate for such addition is methyl alcohol or methanol, which is a byproduct of the gasoline distillation process and could easily be added to the gasoline end product. One of the problems with using methanol as an additive in gasoline that is to be stored in fiberglass tanks is that methanol is an aggressive solvent and will react with the fiberglass, causing deterioration of the fiberglass tank walls. The methanol also has an affinity for water, which always tends to gather in underground tanks and the mixture of the methanol in the water makes an even more aggressive solvent that deteriorates the walls of the fiberglass tank causing leaks and failures in the underground tank.

It is therefore an object of the present invention to provide a fiberglass tank primarily for use in underground applications for the storage of gasoline and other volatile materials that is resistant to the deterioration of the tank walls because of the volatility of the solvent.

SUMMARY OF THE INVENTION

In accordance with the above-stated objects, the invention provides a fiberglass tank having a liner on the interior of said tank comprised of a metal foil. In the preferred method of constructing the tank, a mandrel is covered with a metal foil and layers of resin and glass fiber are overlayed on the metal foil and cured to a solid state, such that the tank includes a fiberglass outer wall and a metal foil inner wall. The foil can be applied to the mandrel in strips laid down in a helical pattern with adjacent coils of the helix overlapping one another to provide complete coverage of the mandrel by the metal foil. In one embodiment of the invention, a metal foil end cap covers the end of the mandrel and the end cap is at least partially overlapped by the metal foil strips wound around the remainder of the mandrel to provide a complete covering of the mandrel by the metal foil.

BRIEF DESCRIPTION OF THE DRAWINGS

The advantages of the present invention will be better understood by those of ordinary skill in the art and others upon reading the ensuing specification when taken in conjunction with the appended drawings wherein:

FIG. 3 is an isometric view of the mandrel of FIG. 1 with the end cap in place and a strip of metal foil being applied to the mandrel;

FIG. 4 is an isometric view of the mandrel at a time later than that shown in FIG. 3 with the metal foil applied substantially to the entire surface of the mandrel; and FIG. 5 is a cross-sectional view of a portion of the tank wall of a tank made in accordance with the principles of the present invention while still on the mandrel.

DETAILED DESCRIPTION OF THE PREFERRED EMBODIMENT

Figure 1:
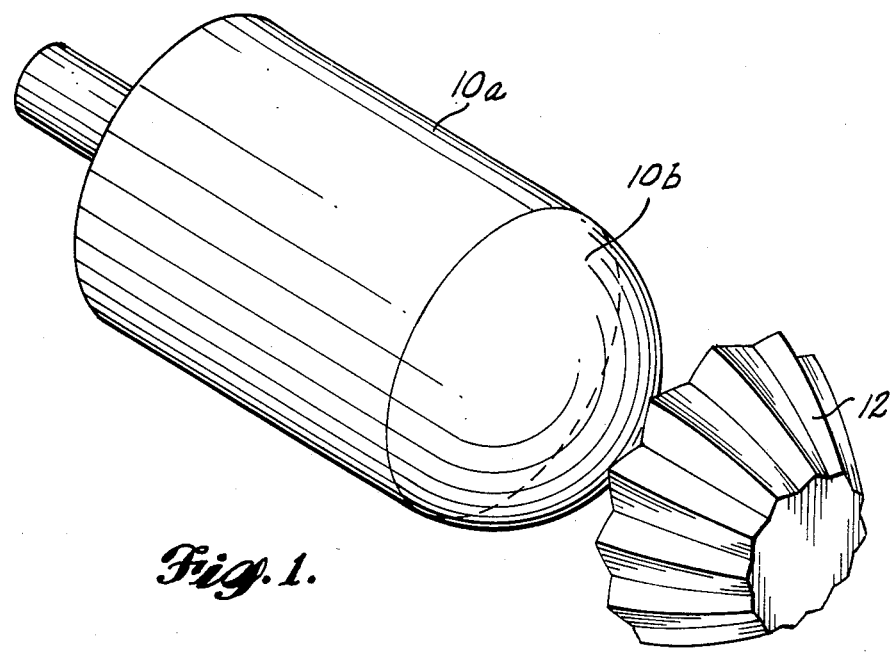
FIG. 1 is an isometric view of a mandrel and a metal foil end cap used in the construction of a fiberglass tank in accordance with the principles of the present invention.
Figure 2:
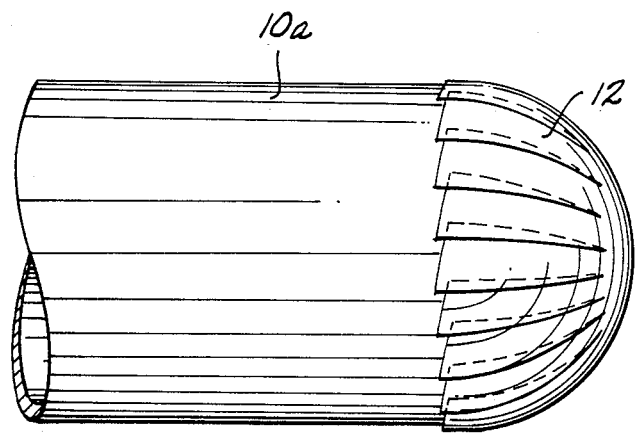
FIG. 2 is a side elevational view of the mandrel of FIG. 1 with the end cap placed in position on the mandrel.

FIGS. 1 through 5 show a preferred method of constructing a foil-lined fiberglass tank that can be used for the storage of gasoline in an underground environment. In FIG. 1, a mandrel 10 is shown. The mandrel 10 is a conventional fiberglass lay-up mandrel used to form relatively large fiberglass parts, such as tanks and pipes. Mandrel 10 has a cylindrical portion 10a and a hemispherical end portion 10b and provides the base for forming one-half of an underground gasoline tank. In practice, two identical tank portions would be formed on a mandrel such as mandrel 10, and then the cylindrical portions of the tank halves would be joined together to complete the underground tank with hemispherical portions formed at each end of the tank.

Conventionally, layers of resin and glass fiber are laid directly over the mandrel for formation of the fiberglass tank. However, in the present invention, a metal foil such as aluminum or stainless steel foil is laid down over the mandrel prior to application of fibers and resin so that the end product tank has a foil inner lining that is resistant to corrosion from petroleum-based solvents.

Referring again to FIG. 1, a foil end cap 12 is shown prior to its placement on the hemispherical portion 10b of the mandrel 10. The end cap 12 is shown in position on the mandrel in FIG. 2. In order to accommodate for the curvature of the portion 10b, the end cap 12 has several pleats formed therein which are folded down flat against the outer surface of the hemispherical portion 10b so that the entire hemispherical portion 10b is covered by the foil. The end cap is pressed into place either manually or by the use of a press to conform it to the curved surface of the portion 10b.

In FIG. 3, a continuous strip 14 of metal foil of the same type as the end cap 12 is shown being placed on the mandrel 10 from a feed spool 16. The mandrel is rotated as shown by the arrow 18, and the foil strip 14 is fed from the spool 16 to encompass the entire outer perimeter of the mandrel. As shown in FIG. 4, the spool moves longitudinally with respect to the mandrel as the mandrel is rotated to lay down a continuous helical covering of foil on the surface of the mandrel. The speed of the rotation of the mandrel and the longitudinal movement of the spool are coordinated so that there is an overlap of the foil strips as they surround the mandrel so that there is complete coverage of the mandrel by the foil with no gaps between adjacent strips. The foil strip 14 overlies the end portion of the end cap 12 so that there is no gap in coverage of the foil on the mandrel.

After the mandrel 10 has been completely covered by the foil end cap 12 and foil strips 14, resin and glass fibers are laid over the mandrel in a conventional manner to form the fiberglass outer shell of the tank. FIG. 5 illustrates a cross section of the tank wall after the fiberglass has been formed. It can be seen that the strips 14 of foil are now coated by a fiberglass layer 20 and the entire assembly rests on the outer surface of the mandrel 10. Typically, some parting agent 22, such as a sheet of polytetrafluoroethylene, for example, Teflon, is laid down over the surface of the mandrel prior to application of the foil sheets to aid in the separation of the tank from the mandrel after the fiberglass has been put down and cured. When the mandrel and parting agent have been removed from the tank, it will be evident that the interior of the tank is now lined with a metal foil and that the gasoline-methanol mixture or other liquid being stored in the tank contacts only the metal foil, which is resistant to corrosion, rather than directly contacting the fiberglass, which can be deteriorated by contact with certain solvents. Resin from the fiberglass-forming operation will seep into the space between adjacent overlapping strips of foil. This tends to keep the foil in place on the tank wall. Some gasoline in the tank may seep into the overlapped seam between strips and contact the resin. However, due to the small surface area of resin exposed to the gasoline at the foil strip interfaces, the corrosive effect of the solvent within the tank on the resin at the overlap areas will be minimal. The tank, therefore, is substantially resistant to corrosion due to the solvent stored within the tank and therefore resistant to leakage caused by solvent corrosion. The leak resistance is accomplished without any reduction in the basic strength of the fiberglass exterior shell, which prevents damage to the tank due to abrasion and piercing from the outside.

While the particular method of forming a fiberglass tank having a metal foil inner lining for underground storage of gasoline has been disclosed herein, it will be understood by those of ordinary skill in the art and others that modifications can be made to the tank itself and the method of forming the tank while remaining within the spirit and scope of the present invention. While the tank of the present invention was wound on a mandrel with a hemispherical end portion, other shapes of tanks could also be formed, in which case, the precise shape of the foil end cap may be different from that illustrated and described, or perhaps the need for an end cap may be eliminated. Also, the foil in the presently disclosed method was laid down in overlapping, helically wound strips; however, the foil could also be placed down in a single large sheet depending on the size of the tank being formed and the desires of the fabricator. Alternatively, the foil could be laid down in parallel adjacent annular strips rather than in a helix. The important feature to realize is that the foil lining of the tank be sufficiently complete so that there is substantially no direct contact between the liquid being stored within the tank and the fiberglass wall of the tank. Since changes can be made to the illustrated and described embodiment and method, the invention should be defined solely with reference to the claims that follow.

The embodiments of the invention in which an exclusive property or privilege is claimed are defined as follows:

1. A tank for the underground storage of petroleum distillate products having a fiberglass wall and a metal foil inner lining substantially completely covering the interior of said tank, said foil lining including a plurality of adjacent partially overlapping strips of metal foil having resin between the overlapping portions of adjacent foil strips, and having the ends of the tank lining comprised of pleated end caps, the pleats constructed and arranged to accommodate the curvature of the ends of the tank.

2. The tank of claim 1, wherein the metal foil is comprised of aluminum.

3. The tank of claim 1, wherein the metal foil is comprised of stainless steel.

4. The tank of claim 1, wherein the foil lining comprises a plurality of parallel, annularly wound strips of foil.

5. The tank of claim 1, wherein the adjacent strips of foil are coils of a continuous helically wound strip of foil.

6. A method of making a leak-resistant fiberglass tank for holding petroleum distillate products including the steps of:
   covering a mandrel with a layer of metal foil by placing a continuous pleated metal foil end cap over an end of the mandrel, compressing the end cap to closely fit the end cap to the shape of the mandrel end, and wrapping the mandrel with a helically wound strip of metal foil, adjacent coils of the helix overlapping one another and the helix coil adjacent the end cap at least partially overlapping the end cap;
   applying resin and glass fibers over said foil strips and end cap to form a fiberglass wall, allowing resin to seep into the interstices between the adjacent wrappings of metal foil; and
   removing the fiberglass and metal foil from the mandrel after curing.

* * * * *